US011726233B2

(12) United States Patent
Guler et al.

(10) Patent No.: US 11,726,233 B2
(45) Date of Patent: Aug. 15, 2023

(54) METHOD OF MAKING A METAMATERIAL DEVICE

(71) Applicant: Purdue Research Foundation, West Lafayette, IN (US)

(72) Inventors: Urcan Guler, West Lafayette, IN (US); Alexander V. Kildishev, West Lafayette, IN (US); Krishnakali Chaudhury, West Lafayette, IN (US); Shaimaa Ibrahim Azzam, West Lafayette, IN (US); Esteban E. Marinero-Caceres, West Lafayette, IN (US); Harsha Reddy, West Lafayette, IN (US); Alexandra Boltasseva, West Lafayette, IN (US); Vladimir M. Shalaev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 431 days.

(21) Appl. No.: 16/835,302

(22) Filed: Mar. 31, 2020

(65) Prior Publication Data
US 2021/0302623 A1    Sep. 30, 2021
US 2022/0397702 A9    Dec. 15, 2022

Related U.S. Application Data

(63) Continuation of application No. 15/978,548, filed on May 14, 2018, now Pat. No. 10,670,772.

(60) Provisional application No. 62/505,427, filed on May 12, 2017.

(51) Int. Cl.
| | |
|---|---|
| *B82Y 20/00* | (2011.01) |
| *G02B 1/00* | (2006.01) |
| *G01N 21/84* | (2006.01) |
| *B82Y 30/00* | (2011.01) |
| *B82Y 40/00* | (2011.01) |

(52) U.S. Cl.
CPC .......... *G02B 1/002* (2013.01); *G01N 21/8422* (2013.01); *B82Y 20/00* (2013.01); *B82Y 30/00* (2013.01); *B82Y 40/00* (2013.01); *G01N 2021/8427* (2013.01)

(58) Field of Classification Search
CPC ..... G02B 1/002; G01N 21/8422; B82Y 20/00
See application file for complete search history.

(56) References Cited

U.S. PATENT DOCUMENTS

| | | |
|---|---|---|
| 4,138,655 A | 2/1979 | Nakano et al. |
| 7,740,403 B2 | 6/2010 | Irrgang et al. |
| 2013/0003066 A1* | 1/2013 | Han ............... G01N 29/34 |
| | | 359/305 |
| 2018/0329115 A1* | 11/2018 | Kildishev ............ G01N 21/21 |

OTHER PUBLICATIONS

Li, W. et al., Refractory Plasmonics with Titanium Nitride: Broadband Metamaterial Absorber, Advanced Materials, vol. 26, pp. 7959-7965 (2014).
Guler, U. et al., Refractory Plasmonics, Science, vol. 344, No. 6181, pp. 263-264 (2014).
Guler, U. et al., Nanoparticle plasmonics: going practical with transition metal nitrides, Materials Today, vol. 18, No. 4, pp. 227-237 (2015).
Reddy, H. et al., Temperature-Dependent Optical Properties of Plasmonic Titanium Nitride Thin Films, ACS Photonics, vol. 4, No. 6, pp. 1413-1420 (2017).
Liu, J. et al., Quasi-coherent thermal emitter based on refractory plasmonic materials, Optical Materials Express, vol. 5, No. 12, pp. 2721-2728 (2015).
Reddy, H. et al., Temperature-Dependent Optical Propertis of Single Crystalline and Polycrystalline Silver Thin Films, ACS Photonics, vol. 4, No. 5, pp. 1083-1091 (2017).
Reddy, H. et al., Temperature-dependnet optical properties of gold thin films, Optical Materials Express, vol. 6, No. 9, pp. 2776-2802 (2016).
Naik, G. et al., Alternative Plasmonic Materials: Beyond Gold and Silver, Advanced Materials, vol. 25, No. 24, pp. 3264-3294 (2013).
Li, W., Refractory Plasmonics with Titanium Nitride: Broadband Metamaterial Absorber, Advanced Materials, vol. 26, No. 47, pp. 7959-7965 (2014).
Guller, U. et al., Plasmonics on the slope of enlightenment: the role of transition metal nitrides, Faraday Discussions, vol. 178, pp. 71-86 (2015).

* cited by examiner

*Primary Examiner* — Randy Boyer
(74) *Attorney, Agent, or Firm* — Purdue Research Foundation (57) ABSTRACT

An optical sensor system, comprising refractory plasmonic elements that can withstand temperatures exceeding 2500° C. in chemically aggressive and harsh environments that impose stress, strain and vibrations. A plasmonic metamaterial or metasurface, engineered to have a specific spectral and angular response, exhibits optical reflection characteristics that are altered by varying physical environmental conditions including but not limited to temperature, surface chemistry or elastic stress, strain and other types of mechanical load. The metamaterial or metasurface comprises a set of ultra-thin structured layers with a total thickness of less than tens of microns that can be deployed onto surfaces of devices operating in harsh environmental conditions. The top interface of the metamaterial or metasurface is illuminated with a light source, either through free space or via an optical fiber, and the reflected signal is detected employing remote detectors.

13 Claims, 11 Drawing Sheets

METHOD OF MAKING A METAMATERIAL DEVICE

CROSS-REFERENCE TO RELATED APPLICATIONS

The present U.S. patent application is a continuation of U.S. patent application Ser. No. 15/978,548, which issued on Jun. 2, 2020, as U.S. Pat. No. 10,670,772, which claims priority to U.S. Provisional Patent Application No. 62/505,427, filed May 12, 2017.

GOVERNMENT SUPPORT CLAUSE

This invention was made with government support under DMR 1506775 awarded by National Science Foundation. The government has certain rights in the invention.

TECHNICAL FIELD

The present application relates to ambient conditions sensors and detectors, and more specifically, to sensors and detectors for use in harsh environments.

BACKGROUND

Process controls systems, such as those used in industrial and chemical processing and manufacturing, rely on ambient conditions sensors to provide real time measurement of physical parameters such as temperature, pressure, surface chemistry, elastic strain, or other mechanical load. Such sensors often need to be deployed in high temperature, chemically aggressive, or mechanically harsh environments. In such extreme ambient conditions, the use of closed-loop feedback control of a device operation is necessary to prevent component failure. One of the main challenges in harsh ambient conditions sensing is the failure of the electronic devices required for said measurements. Temperatures exceeding a few hundred degrees Celsius may lead to electronics component failures and mandate the use of complex cooling systems, which add to the complexity and cost of the system.

SUMMARY

One aspect of the present application relates to a plasmonic sensor system including continuous and nanostructured layers of refractory plasmonic transition metal nitrides. The plasmonic sensor system further includes refractory dielectric layers that can be utilized as spacer layers and oxidation resistant coatings. Additionally, the plasmonic sensor system includes an electromagnetic radiation source emitting in the visible, infrared or microwave bands of the electromagnetic spectrum that illuminates the refractory plasmonic metamaterial/metasurface. Moreover, the plasmonic sensor system includes a detector that measures the reflected signal from the metamaterial/metasurface.

Another aspect of the present application relates to a metamaterial device including a spacer over a base, wherein the base includes at least one of ZrN, HfN, or TiN. The metamaterial device further includes a plasmonic nanostructure over the spacer, wherein the plasmonic nanostructure includes at least one of ZrN, HfN, or TiN. Additionally, a thickness of the spacer is configured to be less than a wavelength of an incidental light. Furthermore, a thickness of the base is configured to be larger than a skin depth of wavelength of the incidental light.

Still another aspect of the present disclosure relates to a metamaterial device including a spacer over a base, wherein the base includes at least one of ZrN, HfN, or TiN. Additionally, the metamaterial includes a plasmonic nanostructure over the spacer, wherein the plasmonic nanostructure includes at least one of ZrN, HfN, or TiN. Additionally, a thickness of the spacer is configured to be less than a wavelength of an incidental light. Moreover, a thickness of the base is configured to be larger than a skin depth of wavelength of the incidental light. Furthermore, the plasmonic nanostructure includes a first ratio ranging from $10^{-3}$ to 10, wherein the first ratio includes a ratio of height over width.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

According to one aspect, the present disclosure provides a remote sensing technique which relies on ultra-thin film refractory plasmonic metamaterials/metasurfaces deposited onto the surface of the harsh-environment device to monitor reflectance signal changes originating from variations in parameters being measured such as temperature, strain, corrosion, creep or fatigue. The presently disclosed sensing scheme is based on the dependence of the optical properties of a sensing plasmonic material on environmental changes. Changes in material properties caused by the harsh environment result in changes in the optical response of plasmonic metamaterial/metasurface coatings, which are detected remotely.

Figure 1:
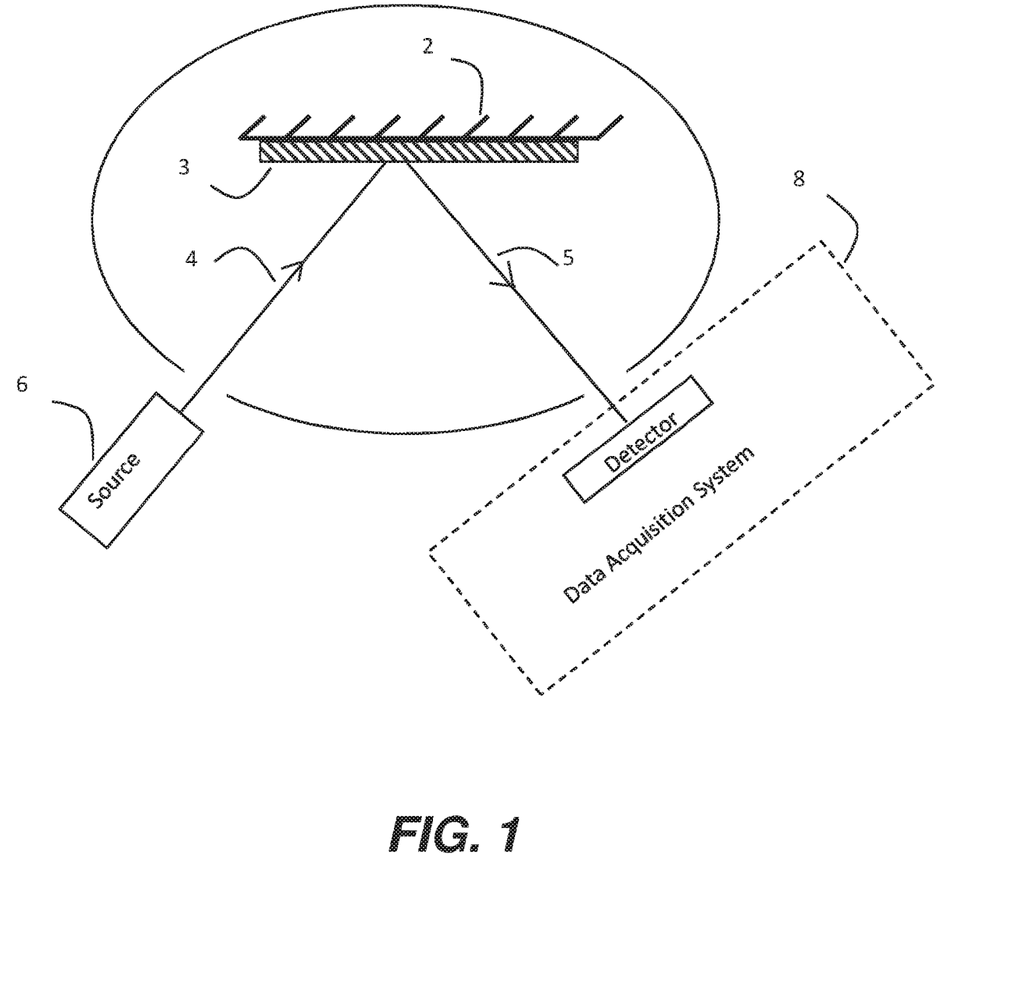
FIG. 1 is a sensing system in accordance with one or more embodiments.

As shown in FIG. 1, according to various embodiments, a sensing system of the present disclosure includes a metamaterial/metasurface (3) made of a refractory plasmonic material that is deposited or adhered onto a surface under test (2), a remote light source (6) to illuminate, via light beam (4), the metamaterial/metasurface, and a detector system (8) located outside the harsh environment to measure changes in reflectance (5) properties induced by physical and chemical changes in the monitored environment.

Figure 2:
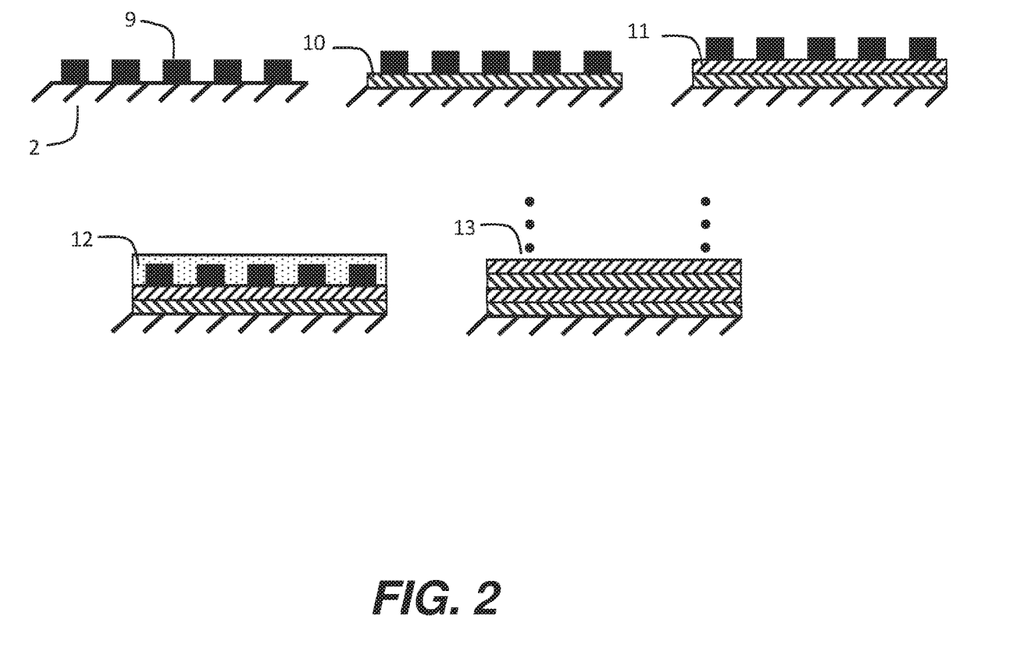
FIG. 2 is a metamaterial device in accordance with one or more embodiments.

As shown in FIG. 2, the metamaterial/metasurface device of the present disclosure includes refractory plasmonic nanostructures (9) configured to yield collective resonances in the visible, infrared or microwave ranges of the electromagnetic spectrum. In at least one embodiment, the refractory plasmonic nanostructures include at least one of titanium nitride (TiN), Hafnium nitride (HfN), or Zirconium nitride (ZrN). In one or more embodiments, each refractory plasmonic nanostructure of the refractory plasmonic nanostructures has a first ratio (i.e. ratio of height over width) ranging from $10^{-3}$ to 10. The nanostructures can be combined with ultrathin films (10) of refractory plasmonic or dielectric materials to engineer the reflectance properties so that the reflected signal provides distinct spectral changes with changing physical parameters of interest. The design can be deployed with additional refractory plasmonic or dielectric thin films (11) for further improvement of the spectral response or system's durability. In one or more embodiments, the sensing refractory plasmonic material are protected against corrosion with overcoating layers made of refractory dielectric thin films (12). A variety of combinations are possible including nanostructure-free, stacked thin film designs (13) or irregular layers of nanostructured films and continuous thin films.

Figure 3:
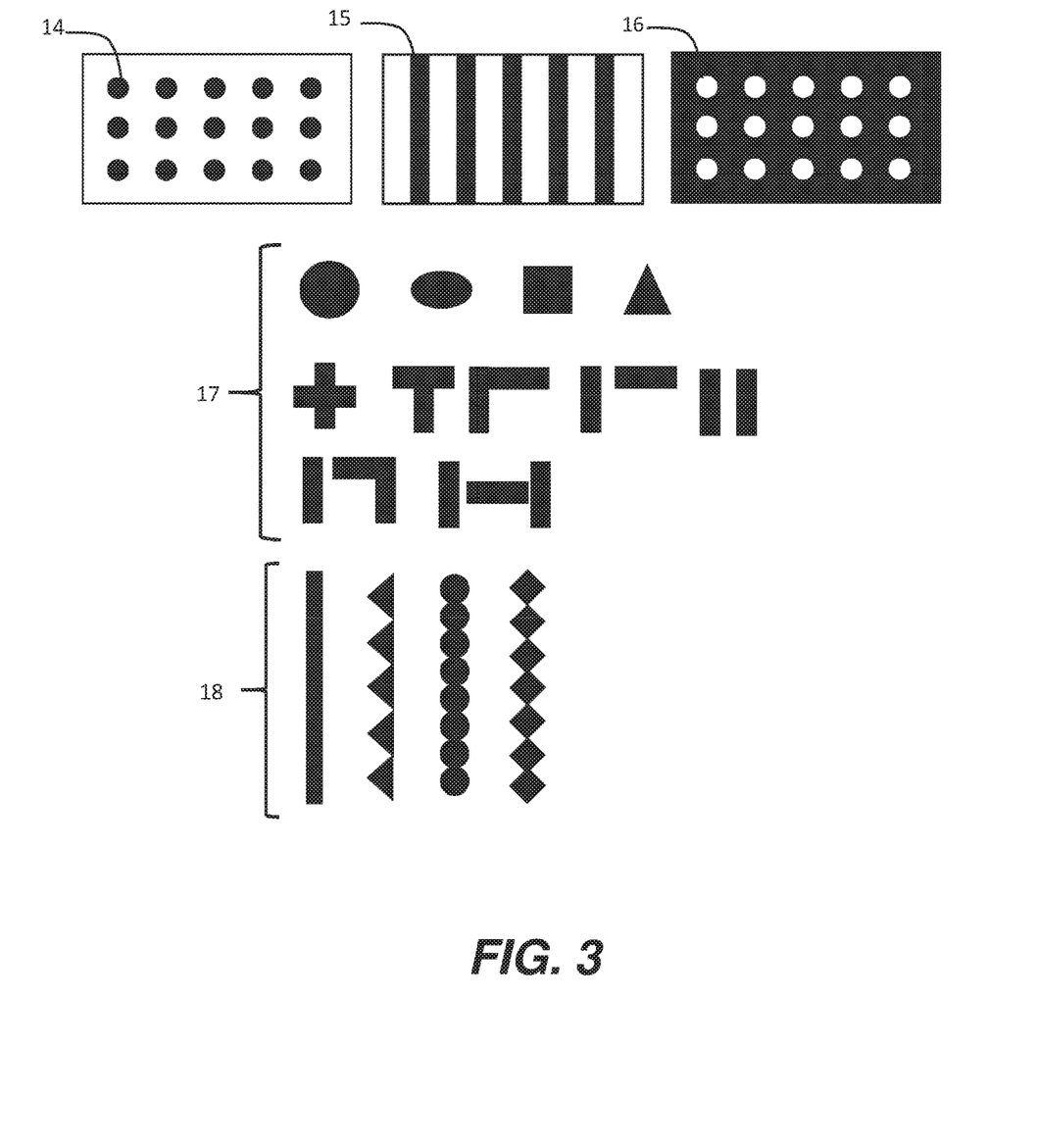
FIG. 3 is a pattern of a plasmonic nanostructure in accordance with one or more embodiments.
Figure 4:
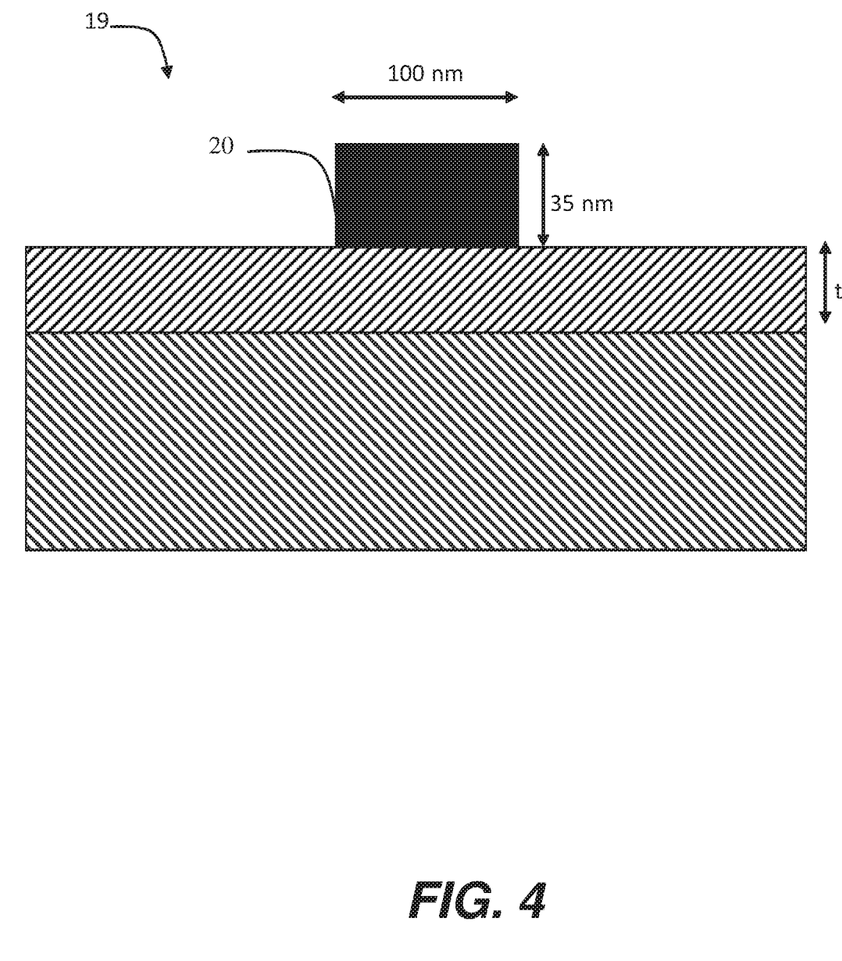
FIG. 4 is a metamaterial device in accordance with one or more embodiments.
Figure 5A:
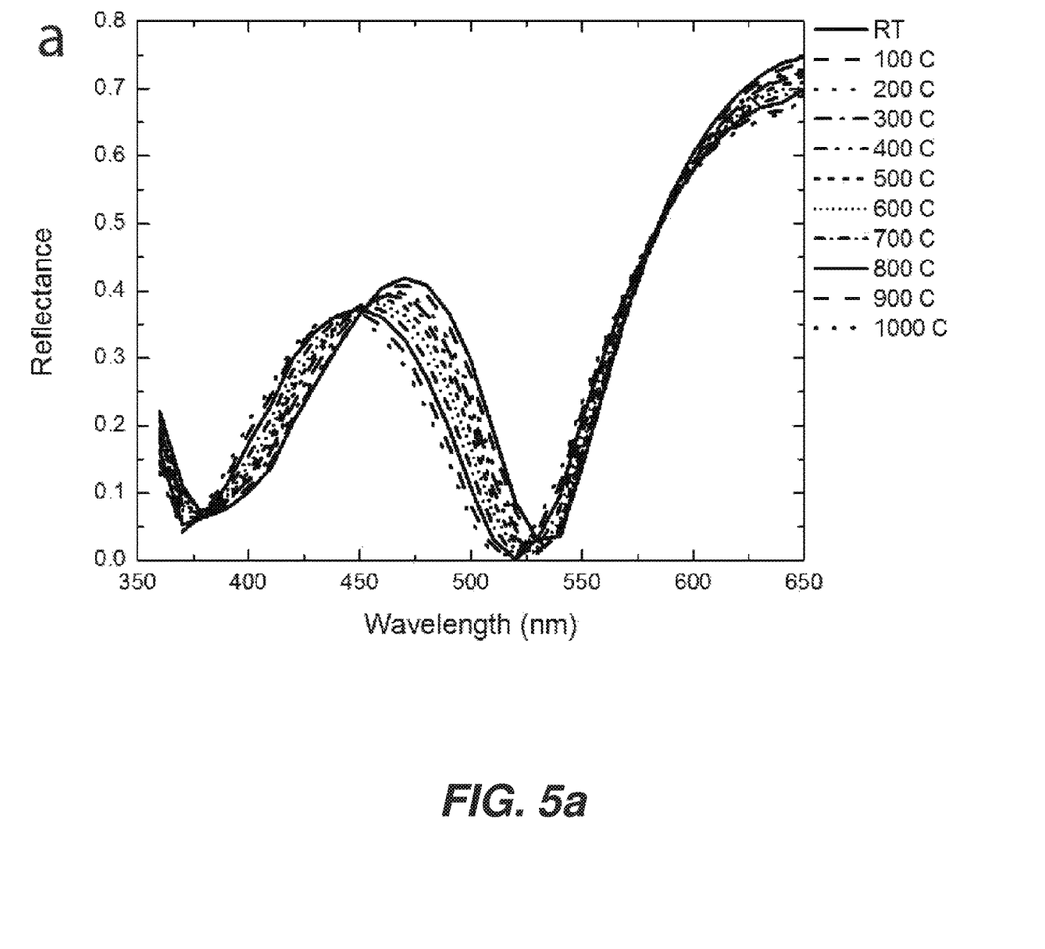
FIG. 5a illustrates the calculated reflectance spectra of a metasurface device comprising a TiN backplane, a SiN spacer, and TiN nanostrips, in accordance with a first dimension.
Figure 5B:
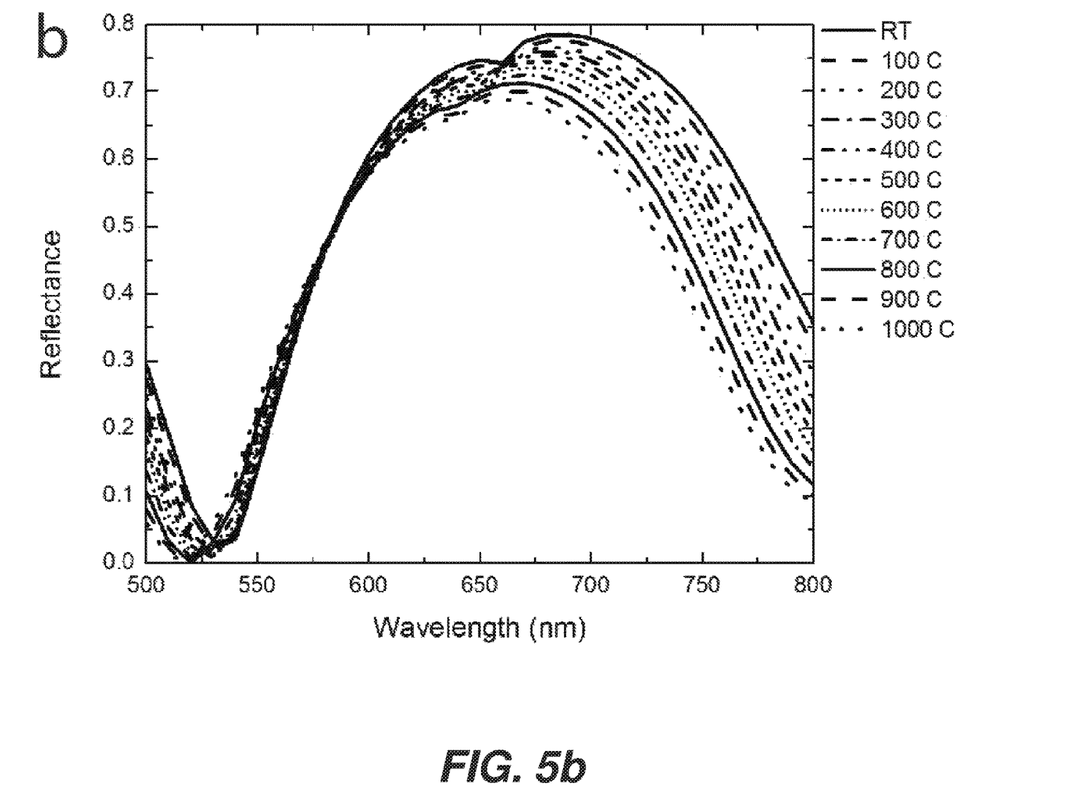
FIG. 5b illustrates the calculated reflectance spectra of a metasurface device comprising a TiN backplane, a SiN spacer, and TiN nanostrips, in accordance with a second dimension.
Figure 5C:
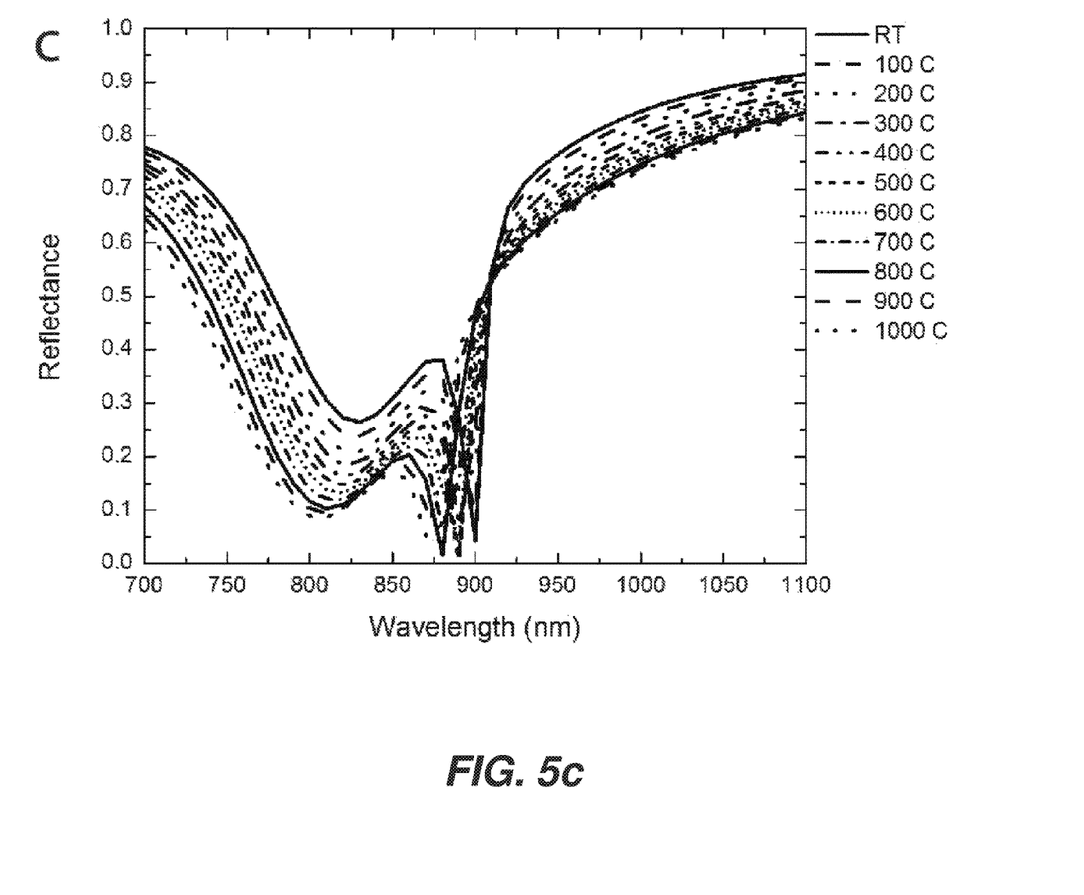
FIG. 5c illustrates the calculated reflectance spectra of a metasurface device comprising a TiN backplane, a SiN spacer, and TiN nanostrips, in accordance with a third dimension.
Figure 5D:
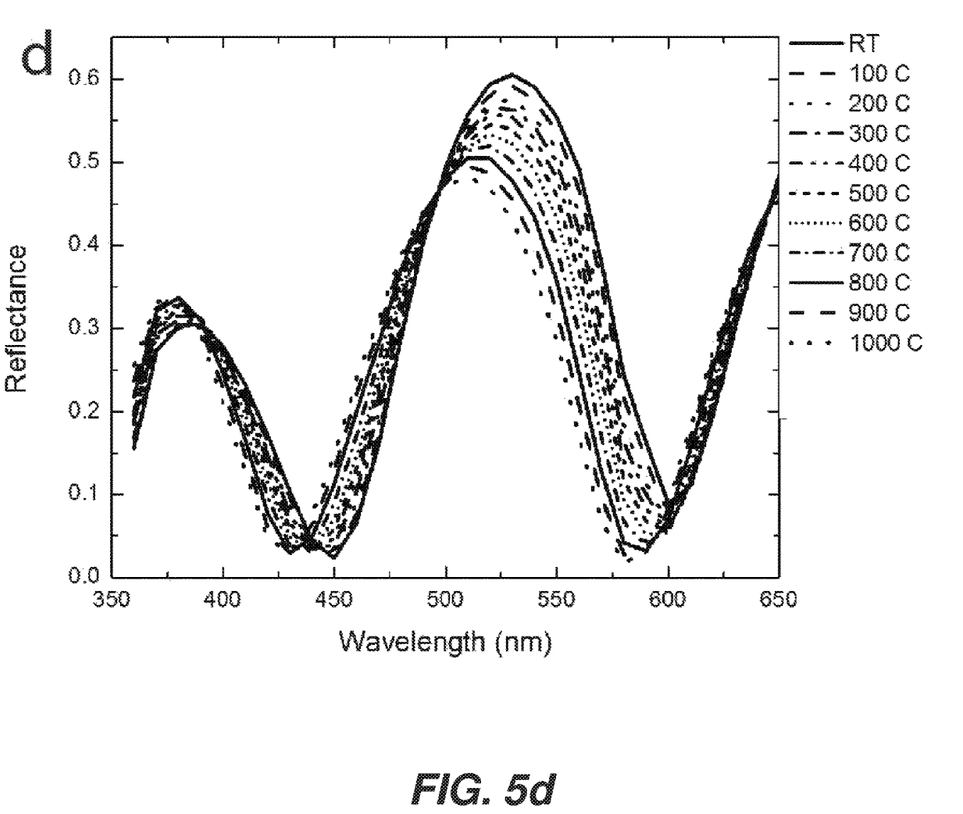
FIG. 5d illustrates the calculated reflectance spectra of a metasurface device comprising a TiN backplane, a SiN spacer, and TiN nanostrips, in accordance with a fourth dimension.
Figure 5E:
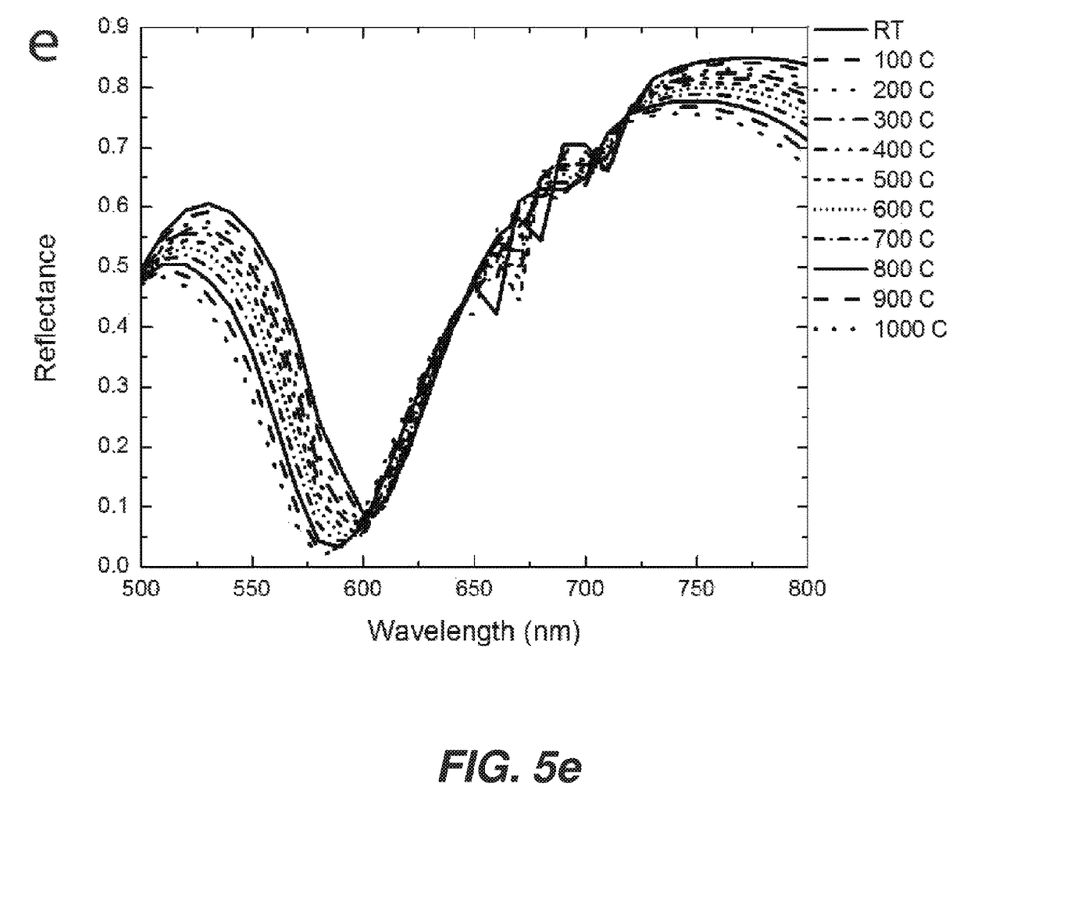
FIG. 5e illustrates the calculated reflectance spectra of a metasurface device comprising a TiN backplane, a SiN spacer, and TiN nanostrips, in accordance with a fifth dimension.
Figure 5F:
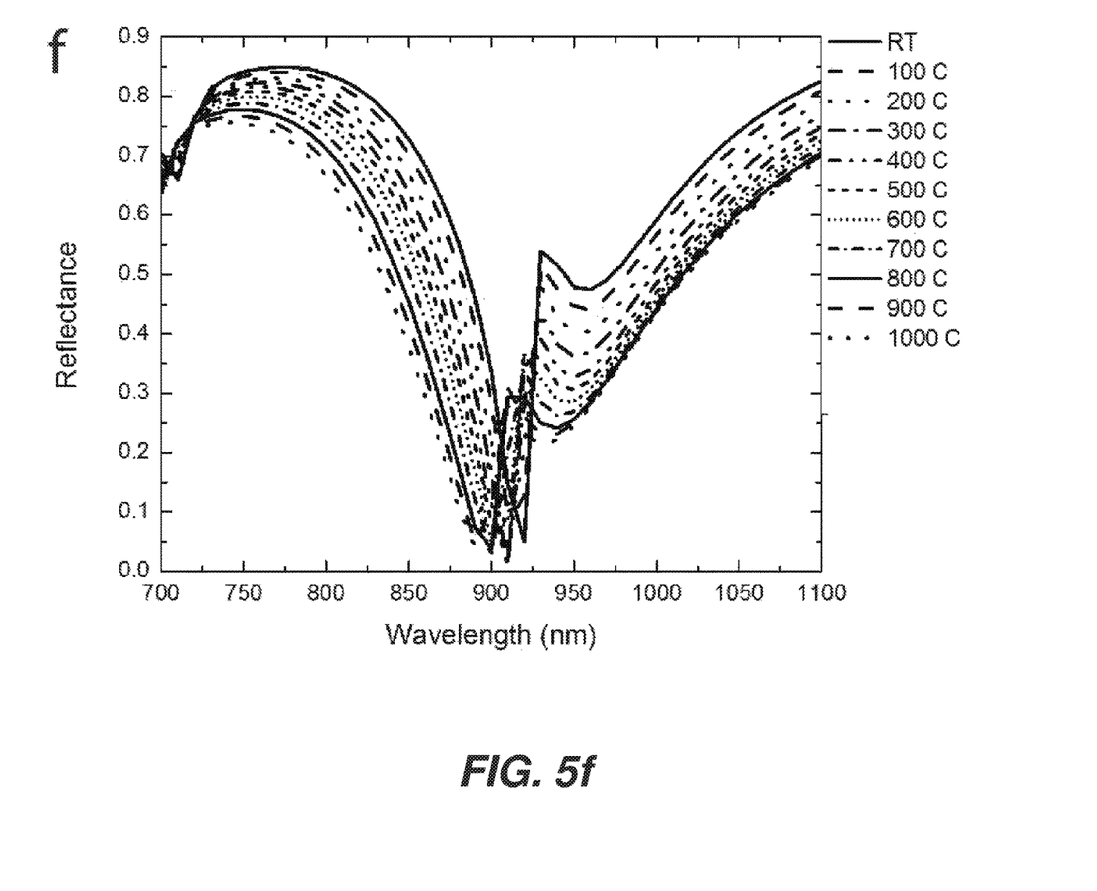
FIG. 5f illustrates the calculated reflectance spectra of a metasurface device comprising a TiN backplane, a SiN spacer, and TiN nanostrips, in accordance with a sixth dimension.

As shown in FIG. 3, a pattern of the refractory plasmonic nanostructures of the present disclosure comprise nanoparticle arrays (14), nanostrips (15), or nanoholes (16) with regular or irregular patterns. The particle shapes can be simple geometries or any combination of nanoparticles (17) and strips (18). FIG. 4 shows the cross-sectional view of an exemplary unit cell (19) of a metasurface device with an array of nanostrips (20) used in the simulation of reflectance properties. As illustrated, a spacer lies between refractory plasmonic nanostructure 20 and the base. In some embodiments, the spacer comprises silicon nitride. In some embodiments the spacer includes at least one of $SiN_x$, $Al_2O_3$, AlN, BN, $SiO_2$, $HfO_2$, $HFSiO_x$, HFSiON, $ZrO_2$, or $La_2O_3$. In at least one embodiment, the base comprises at least one of titanium nitride (TiN), Hafnium nitride (HfN), or Zirconium nitride (ZrN).

As further illustrated in FIG. 4, a height of the refractory plasmonic nanostructure is 35 nm, and a width of the refractory plasmonic nanostructure is 100 nm. In some embodiments, the height of the refractory nanostructure ranges from 1 nanometers (nm) to 300 nm. In some embodiments, the width of the refractory nanostructure ranges from 30 nm to 1000 nm. In one or more embodiments, the refractory plasmonic nanostructure has a first ratio (i.e. ratio of height over width) ranging from $10^{-3}$ to 10. A thickness of the spacer is sub-wavelength (i.e. smaller than a wavelength of an incidental light) according to at least one embodiment. In some embodiments, a thickness of the base is such that an intensity of an incidental light is 0 at a back interface of the base. In some embodiments, a thickness of the base is larger than a skin depth of wavelength of incidental light (e.g.: thickness that ranges from 2 skin depth to 3 skin depth).

FIGS. 5a-f show the calculated reflectance spectra of a metasurface device comprising a TiN backplane, a SiN spacer, and TiN nanostrips. Changes of the dielectric permittivity of TiN with varying temperature affect the reflectance of the metasurface. Sharp resonances can be obtained via interference effects by design and a stronger dependence on temperature can be obtained, thereby incrementing the sensitivity.

Figure 6:
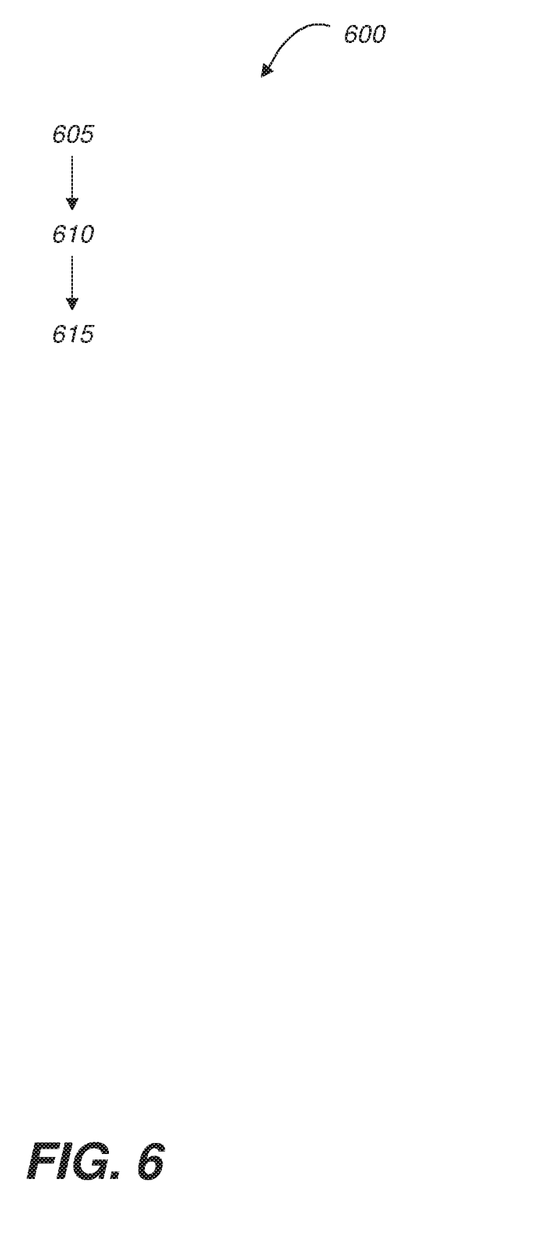
FIG. 6 is a flow chart of a method of making a metamaterial device in accordance with one or more embodiments.

FIG. 6 is a flow chart of a method of making a metamaterial device in accordance with one or more embodiments. Method 600 begins with operation 605 in which a base is formed over a substrate. In at least one embodiment, the base is formed using a metalorganic chemical vapor deposition (MOCVD) process. In some embodiments, the base is formed using molecular beam epitaxy (MBE), hydride vapor phase epitaxy (HVPE), Physical Vapor Deposition (PVD), Chemical Vapor Deposition (CVD), Atomic Layer Deposition (ALD), sputtering, spin-on coating or another suitable formation method.

In operation 610 a spacer is formed over the base. In at least one embodiment, the spacer is formed using a metalorganic chemical vapor deposition (MOCVD) process. In some embodiments, the spacer is formed using molecular beam epitaxy (MBE), hydride vapor phase epitaxy (HVPE), Physical Vapor Deposition (PVD), Chemical Vapor Deposition (CVD), Atomic Layer Deposition (ALD), sputtering, spin-on coating or another suitable formation method.

In operation 615 a plasmonic nanostructure is formed over the spacer. In at least one embodiment, the plasmonic nanostructure is formed using a metalorganic chemical vapor deposition (MOCVD) process. In some embodiments, the plasmonic nanostructure is formed using molecular beam epitaxy (MBE), hydride vapor phase epitaxy (HVPE), Physical Vapor Deposition (PVD), Chemical Vapor Deposition (CVD), Atomic Layer Deposition (ALD), sputtering, spin-on coating or another suitable formation method. In one or more embodiments, the plasmonic nanostructure is formed with various patterns (e.g. FIG. 3).

In another embodiment, the plasmonic metamaterial/metasurface sensor can be designed as a polarization selective surface, which exhibits changes in the polarization of the reflected light with changing temperature.

In another embodiment, the plasmonic metamaterial/metasurface sensor can be designed for a dispersion sensitive response, which can utilize pulse-shaping features and time delays of the reflected optical pulse in time-resolved measurements.

The refractory plasmonic metamaterial/metasurface sensor in the present disclosure comprises transition metal nitrides as the plasmonic constituents. The system also comprises refractory dielectrics such as nitrides, carbides, borides and sulfides as the spacer layers or corrosion protection layers.

In another embodiment, the plasmonic metamaterial/metasurface sensor can comprise luminescent materials with temperature dependent emission signals. The field enhanced by the refractory plasmonic system enhances the luminescence signal from the material and increases the signal quality. The arrangement of refractory plasmonic and luminescent systems in the same embodiment can provide superior sensing solutions in some scenarios.

The sensor of the present disclosure may be constructed on the sensing surface with a variety of industrial coating processes. For example, transition metal nitrides and refractory dielectrics may be used.

In certain embodiments, the metasurface/metamaterial of the present disclosure may be deposited directly on the surface under test. In such an arrangement, intermediate layers for high quality film growth or stronger adhesion may be employed in the system. One advantage of this embodiment is the direct contact of the sensing metasurface/metamaterial with the object under test. Ultrathin films of the present disclosure directly applied to the surface provide enhanced sensing of the physical parameter of interest.

In another embodiment, the metasurface/metamaterial of the present disclosure can be grown on a substrate such as sapphire, MgO, silicon dioxide or silicon nitride. Subsequently the substrate can be adhered to the surface under test. In such an arrangement, higher quality metamaterials/metasurfaces can be obtained at the expense of reduced sensitivity, or possible susceptibility to delamination failure.

In addition, the optical properties of plasmonic materials are expected to change with temperature due to physical mechanisms that include, increasing electron-phonon interactions, reduction of carrier densities and changes of the electron effective mass. Unlike Au and Ag, the refractory metal nitrides retain their microstructure and physical integrity at elevated temperatures, resulting in a stable optical response. The teachings of the present disclosure utilize experimentally determined temperature dependent dielectric permittivities of both the metal nitrides and the protective dielectric coatings to sense temperature remotely, using nondestructive techniques. The sensors of the present disclosure utilize refractory plasmonic transition metal nitrides that exhibit plasmonic resonances in the visible, infrared and microwave regions of the electromagnetic spectrum. Together with refractory dielectrics and refractory metal nitrides, the refractory plasmonic material system of this disclosure, provides durable sensors.

Temperature measurement in hot zones is one of the applications where the present disclosure will be beneficial. Measurement techniques based on resistivity/conductivity deviations with changing temperature require refractory packaging in the hot zone and results in limitations of the highest temperatures that can be measured. Current-art alternatives for high temperature sensing utilizing optical methods are based on temperature dependent fluorescence, optical fibers, or a combination of the two.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of making a metamaterial device comprising:
    forming a spacer over a base, wherein the base comprises at least one of ZrN, HfN, or TiN;
    forming a plasmonic nanostructure over the spacer, wherein the plasmonic nanostructure comprises at least one of ZrN, HfN, or TiN;
    wherein a thickness of the spacer is configured to be less than a wavelength of an incident light; and
    wherein a thickness of the base is configured to be larger than the equivalent of a skin depth of the incident light in the base.

2. The method of claim 1, wherein the spacer comprises at least one of $SiN_x$, $Al_2O_3$, AlN, BN, $SiO_2$, $HfO_2$, $HFSiO_x$, HFSiON, $ZrO_2$, or $La_2O_3$.

3. The method of claim 1, wherein the thickness of the base ranges from the equivalent of 2 skin depths to 3 skin depths of the incident light in the base.

4. The method of claim 1, wherein the plasmonic nanostructure comprises a first ratio ranging from $10^{-3}$ to 10, wherein the first ratio comprises a ratio of height over width.

5. The method of claim 1, wherein a height of the plasmonic nanostructure ranges from approximately 1 nanometer (nm) to 300 nm, and a width of the plasmonic nanostructure ranges from approximately 30 nm to 1000 nm.

6. A method of making a metamaterial device comprising:
    forming a spacer over a base;
    forming a plasmonic nanostructure over the spacer;
    wherein a thickness of the spacer is configured to be less than a wavelength of an incident light;
    wherein a thickness of the base is configured to be larger than the equivalent of a skin depth of the incident light in the base; and
    wherein the plasmonic nanostructure comprises a first ratio ranging from $10^{-3}$ to 10, wherein the first ratio comprises a ratio of height over width.

7. The metamaterial device of claim 6, wherein a height of the plasmonic nanostructure ranges from approximately 1 nanometer (nm) to 300 nm, and a width of the plasmonic nanostructure ranges from approximately 30 nm to 1000 nm.

8. A method of making a metamaterial device comprising:
    forming a spacer over a base; and
    forming a plasmonic nanostructure over the spacer;
    wherein a thickness of the spacer is configured to be less than a wavelength of an incidental incident light;
    wherein a thickness of the base is configured to be larger than the equivalent of a skin depth of the incident light in the base.

9. The method of claim 8, wherein the spacer comprises at least one of $SiN_x$, $Al_2O_3$, AlN, BN, $SiO_2$, $HfO_2$, $HFSiO_x$, HFSiON, $ZrO_2$, or $La_2O_3$.

10. The method of claim 8, wherein the thickness of the base ranges from the equivalent of 2 skin depths to 3 skin depths of the incident light in the base.

11. The method of claim 8, wherein the base comprises at least one of ZrN, HfN, or TiN.

12. The method of claim 8, wherein a height of the plasmonic nanostructure ranges from approximately 1 nanometer (nm) to 300 nm, and a width of the plasmonic nanostructure ranges from approximately 30 nm to 1000 nm.

13. The method of claim 8, wherein the plasmonic nanostructure comprises at least one of ZrN, HfN, or TiN.

* * * * *